Feb. 13, 1940.                J. J. BLACK                 2,190,373
                SEMITRAILER PROP ACTUATING MECHANISM
                    Filed May 6, 1938        3 Sheets-Sheet 1
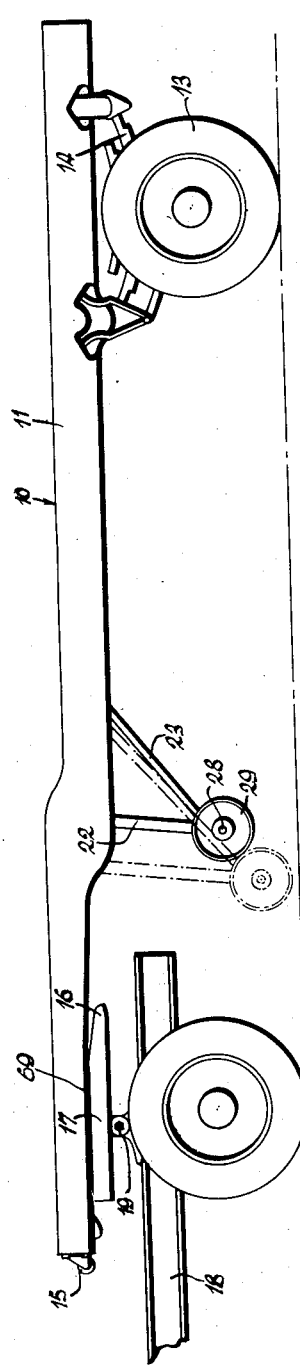
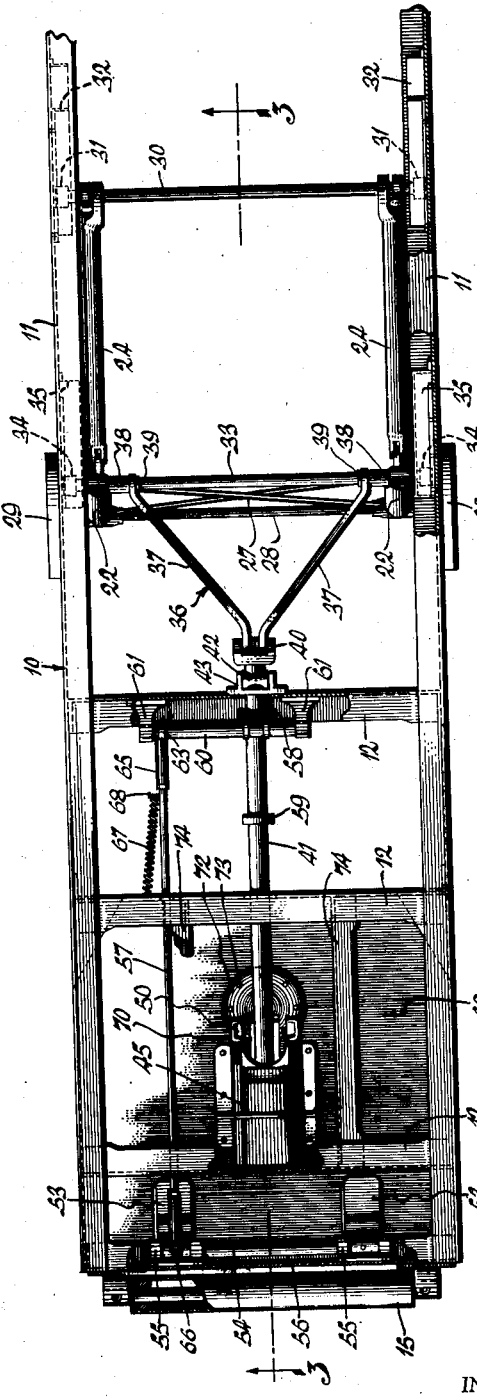
INVENTOR.
James J. Black
BY Wood & Wood
ATTORNEYS Feb. 13, 1940. J. J. BLACK 2,190,373
SEMITRAILER PROP ACTUATING MECHANISM
Filed May 6, 1938  3 Sheets-Sheet 2
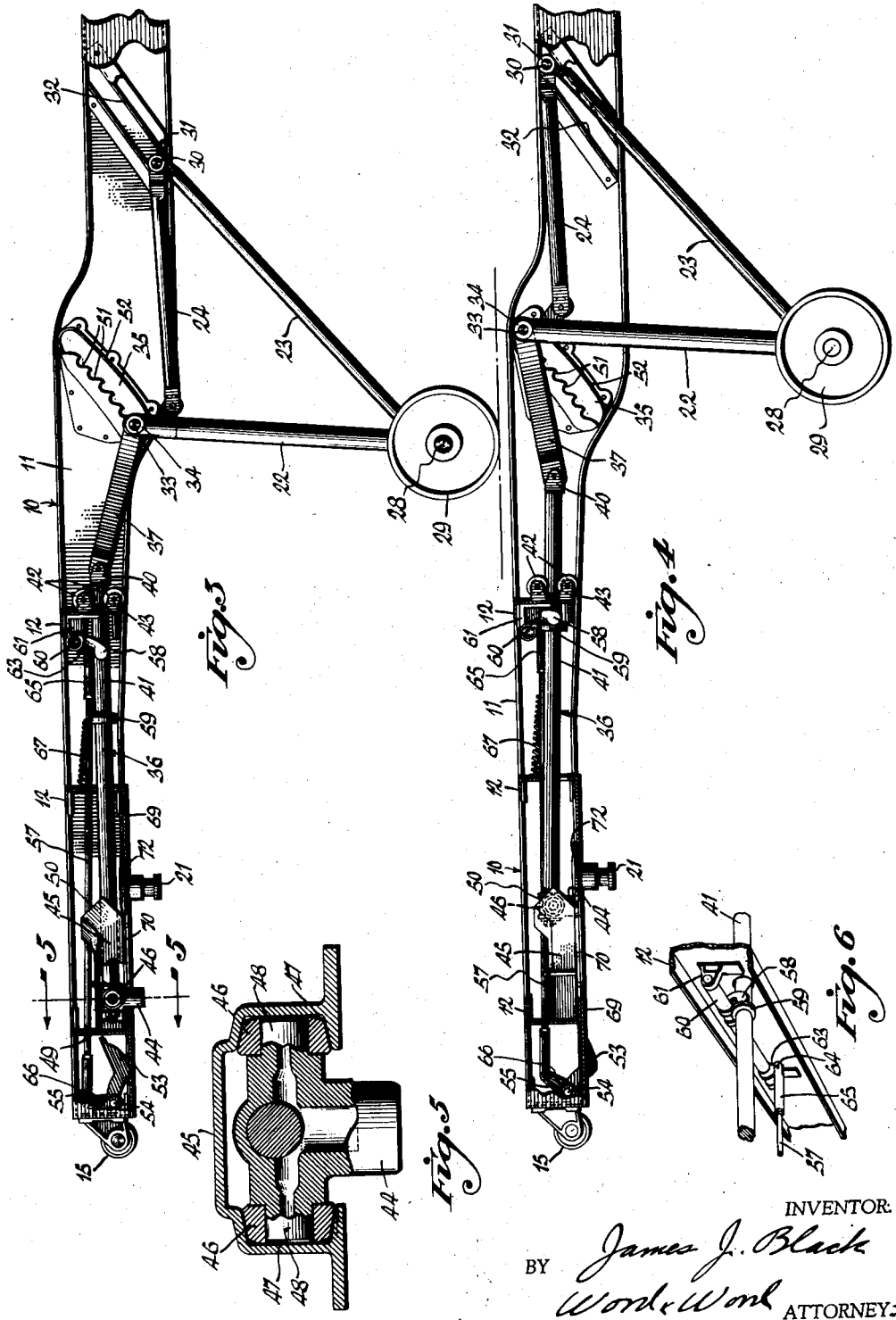
INVENTOR:
James J. Black
BY Word & Word ATTORNEYS Feb. 13, 1940.  J. J. BLACK  2,190,373
SEMITRAILER PROP ACTUATING MECHANISM
Filed May 6, 1938  3 Sheets-Sheet 3

INVENTOR.
James J. Black
BY Word & Word
ATTORNEYS

Patented Feb. 13, 1940

2,190,373

UNITED STATES PATENT OFFICE 2,190,373

SEMITRAILER PROP ACTUATING MECHANISM

James J. Black, Cincinnati, Ohio, assignor to The Trailer Company of America, Cincinnati, Ohio, a corporation of Delaware Application May 6, 1938, Serial No. 206,441

26 Claims. (Cl. 280—33.1)

This invention relates to trailers of the class generally known as semitrailers. A vehicle of this sort is provided with rear wheels only, and its forward end is supported upon the tractor or truck to which it is coupled. A retractable prop is used to sustain the forward end of the trailer when it is uncoupled from the tractor. This prop is retracted, or raised, when the trailer is in draft position, and lowered, so as to contact the roadway and sustain the forward end of the trailer, when the trailer is uncoupled from the tractor. The present invention is specifically directed to an improved mechanism for automatically raising, or lowering, the prop when the trailer is coupling or uncoupling.

The forward end of the semitrailer includes a supporting plate, or fifth wheel, so constructed as to rest upon a corresponding supporting plate, or fifth wheel, of the tractor. These tractor and trailer fifth wheels include cooperating latching, or coupling, devices which interlock to establish the draft connection between the tractor and trailer when the two vehicles are coupled.

The device commonly utilized in coupling semitrailers comprises a king pin on the trailer and coupling means on the tractor, or vice versa. The king pin and the coupling means are mounted on the trailer and tractor fifth wheels respectively, and serve to couple the vehicles automatically when the tractor is backed into place under the forward end of the trailer. Thus, fifth wheel couplings may be divided into two general classes of standard design, one having the king pin secured on the tractor fifth wheel and the other having the king pin on the trailer fifth wheel. The present improvements are applicable preferably to trailers having fifth wheels of the latter class.

In tractor trailer combinations of the first-mentioned class, that is, when the tractor has the king pin mounted on the fifth wheel, the mechanism for automatically raising and lowering the prop has heretofore been relatively simple, consisting of a push rod for raising and lowering the prop, operated by contact with the stationary king pin on the tractor.

On the other hand, the application of automatic props to trailers having the king pin on the trailer fifth wheel has necessitated more complicated mechanisms. In such cases, the difficulty has been that the king pin on the trailer fifth wheel has been stationary, and a complicated fifth wheel structure and mounting for shifting the prop were required. In general, such mechanisms consisted of means for shifting the trailer fifth wheel bodily, either lineally or angularly in relation to the trailer, during the coupling motion. The fifth wheels have been connected by suitable rods and linkages to the prop, automatically to raise or lower the prop upon coupling or uncoupling the trailer. Also, raising and lowering of the prop has been accomplished by means of a slidable king pin on the trailer fifth wheel, operatively connected to the prop-actuating mechanism.

In view of the hard service to which the coupling members are subjected, the above mentioned arrangements present certain inherent difficulties which render them of questionable value. Bearing in mind that the entire draft of the tractor is exerted on the king pin and fifth wheel of the trailer, it is obvious that any structural weakness or looseness is decidedly hazardous and apt to lead to eventual failure of the coupling. Moreover, such mechanisms are of necessity intricate, and more apt to become complicated, and to fail, in use.

Accordingly, it has been an objective of the present inventor to provide an automatic prop-actuating mechanism adapted to operate in conjunction with a standard interchangeable fifth wheel of the type having a rigidly mounted king pin. Therefore, a trailer thus equipped can be coupled with tractors having the conventional fifth wheel, without any change in the structure of the tractor fifth wheel.

It has been another objective of the inventor to provide an improved prop-actuating mechanism which includes a safety means for lowering the prop without fail when the trailer is uncoupled from the tractor, and before the support afforded by the tractor has been withdrawn.

Another objective of the inventor has been to provide, in conjunction with a trailer fifth wheel, an automatic prop-actuating mechanism separate from the coupling device and independent of the normal coupling means of the trailer.

Another objective has been to provide an automatic prop raising and lowering mechanism which simplifies the use of a rigidly mounted king pin and fifth wheel. For this purpose, the prop is actuated by means of a slidable supplemental means which cooperates with the conventional tractor fifth wheel to elevate the prop during the coupling movement of the tractor, and which retracts vertically at the end of the prop elevating movement to permit coupling of the tractor to the stationary king pin of the trailer fifth wheel in the usual manner. In referring to stationary king pins, it will be understood that this is intended to include not only king pins which are immovable in every respect, but also that type which is fixed on a rocking fifth wheel, or which has no movement effective for operating the prop.

These objectives have been attained in the present invention which embodies a trailer fifth wheel with the usual stationary king pin and, in addition, provides a supplemental mechanism to raise or lower the prop automatically upon coupling or uncoupling the trailer. The mechanism employs a downwardly projected slidable pin, similar to the rigidly mounted king pin. The slidable pin is adapted to be engaged within the throat of the tractor fifth wheel during the coupling movement to retract the prop. During completion of the coupling movement, the pin retracts upwardly, and the coupling is effected with the king pin in the regular manner and the prop is locked in upper position.

Further objectives and advantages of the invention will be more fully set forth in the description of the drawings illustrating a preferred embodiment of the invention.

Figure 1 is a side view of a trailer and the rear end of a tractor, illustrating the trailer supported on and in draft connection with the tractor.

Figure 2 is an enlarged fragmentary plan view of the forward end of the trailer.

Figure 3 is a sectional view taken on line 3—3, Figure 2, illustrating the prop of the trailer in operative or load sustaining position.

Figure 4 is a view taken similarly to Figure 3, illustrating the prop in retracted position.

Figure 5 is a sectional view taken on line 5—5, Figure 3.

Figure 6 is a fragmentary perspective view illustrating the mechanism for imparting a positive pull-down action to the prop when the trailer is uncoupled from the tractor.

Figure 7:
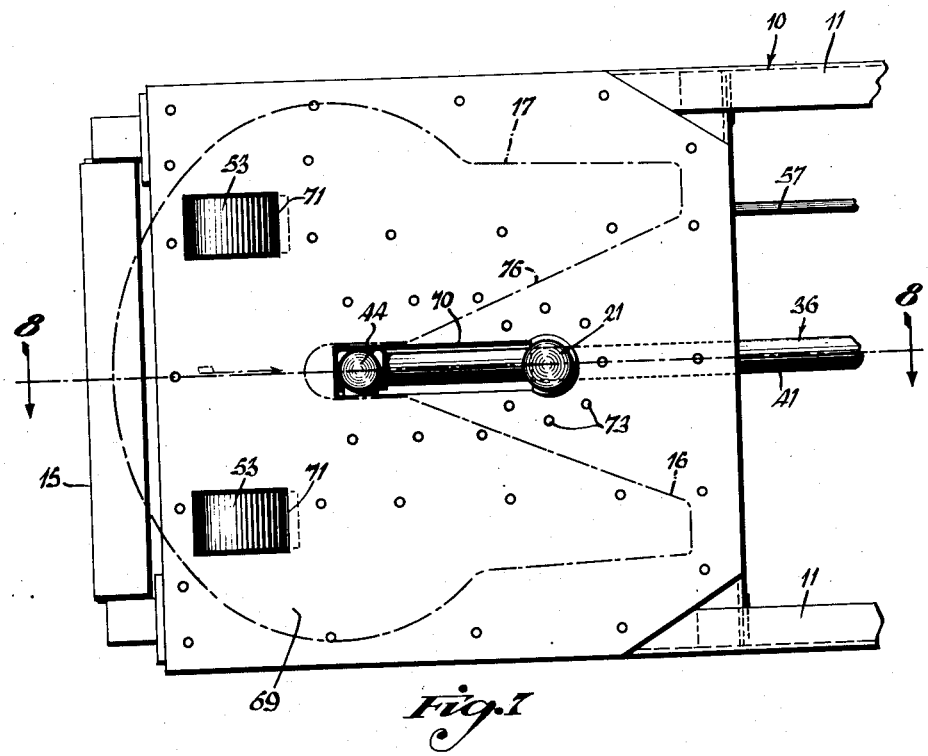
Figure 7 is a bottom plan view of the upper fifth wheel of the trailer, illustrating in dot and dash lines the lower fifth wheel of the tractor moving into position for coupling.

Since the mechanism of the present invention is located entirely at the forward end of the trailer, the disclosure of the structural details of the trailer frame is confined to the environment of the prop. Only those parts of the trailer and tractor combination are illustrated which are necessary for an understanding of the general utility of the prop and its relationship to the tractor and roadway.

Referring to the drawings, the trailer frame, indicated generally at 10, is formed of channel iron side rails 11, and cross rails 12. The combination as illustrated is of the type commonly known as a semitrailer, in which the forward end of the trailer is supported on the tractor and the rear end on wheels 13 by means of springs 14.

The forward end of the trailer includes a roller 15 adapted to cooperate with the skid portion 16 of the lower fifth wheel 17 of the tractor 18. The fifth wheel is secured on the tractor by means of brackets 19 and includes a suitable coupling mechanism 20 adapted to cooperate with the king pin 21 of the upper fifth wheel. The details of the coupling mechanism of the lower fifth wheel are not disclosed since the mechanism is conventional and is designed to cooperate with several well known coupling structures. The lower or tractor fifth wheel, therefore, is illustrated diagrammatically.

The retractable prop is fabricated of pipe sections in the customary manner. Briefly described, the prop comprises a pair of main standards or support legs 22, a pair of bracing arms 23, extending forward and upward from the lower end of the main supporting legs and, a pair of horizontal upper braces 24. These members are disposed in triangular relationship and secured together at their connecting points. The main support standards or legs 22 are reinforced by means of an X brace consisting of flat strips of metal 27 crossed and bolted to lugs or ears extended inwardly at the upper and lower ends of the respective standards. In this manner, the prop is rigidly braced in order to support the weight of the trailer without springing or buckling. The lower end of the main support leg includes an axle 28, upon the outer ends of which are mounted the wheels 29 of the prop.

The upper ends of the angular bracing arms 24 and the rearward ends of the upper braces are traversed by a cross shaft 30 which extends across the frame of the trailer and includes on each outer end a roller 31. Each of these rollers is disposed in an inclined guideway 32 formed of spaced angle iron pieces secured on the inner side of the trailer frame. The upper end of the standards or legs 22 are traversed by a cross shaft 33 similar to the cross shaft 30. The outer ends of the cross shaft 33 are provided with rollers 34 which are disposed in respective brackets 35 secured to the inner sides of the side rails. The structure and operation of the brackets 32 and 35 will be described more fully in detail in connection with the description of the operating mechanism of the prop retracting devices.

The actuating mechanism for the prop indicated generally at 36 is connected to the prop by means of a pair of links 37. These links are pivotally connected to the cross shaft 33 and secured in place by means of sleeves 38 and collars 39. The forward end of the links 37 are pivotally connected to a yoke 40 secured on the rearwardly extended end of a push rod 41. The push rod is supported at its rear end adjacent to the yoke between a pair of rollers 42 which are rotatably secured in a bracket 43 fixed on a cross rail 12.

The forward end of the push rod includes an actuating pin indicated at 44 which serves to operate the push rod for retracting the prop upon coupling of the tractor to the trailer. The actuating pin is supported (see Figure 5) in a bracket 45 by means of a pair of rollers 46 engaged in a pair of opposed channels 47 formed integrally with the bracket 45. The pin 44 includes a pair of trunnions 48 at right angles to the body of the pin upon which the rollers are mounted. The forward end of the push rod 41 is shouldered and engaged through a bore in the body of the actuating pin and secured in place by means of a nut 49.

The actuating pin is loosely supported in the bracket 45 so as to be free to move horizontally upon contact by the lower fifth wheel of the tractor, during coupling motion of the tractor. It will be noted that the rearward portion of the bracket 45 includes an inclined channel portion 50 integral with the channel 47. The purpose of this inclined channel is to move the actuating pin 44 vertically at the end of its prop retracting stroke and thus withdrew the pin above the plane of the upper fifth wheel and permit the lower fifth wheel to slide into place under the pin.

In considering the movement of the prop, attention is directed to Figures 3 and 4 which show the upper and lower position of the prop assembly. In the lower position (see Figure 3) the trailer is entirely disassociated from the tractor with the full weight of the forward end of the trailer resting on the prop. It will be noted that the upper ends of the main supporting legs or standards 23 may be supported by engagement of the cross shaft 33 in any one of a plurality of notches 51 of the support bracket 35. The series of notches or teeth 51 is an accommodation for irregularities in the surface of the ground upon which the prop rests permitting it to assume a position of support at any point along the angular support brackets.

Each of the brackets 32 and 35 constitutes an inclined guideway in which the upper ends of the prop are slidably supported. Each pair of inclined guideways slants downwardly and forwardly at approximately the same degree of slant. In practice the notches 51 of the bracket 35 are formed in the inner side wall of the brackets and the anti-friction rollers are disposed on the inside of this wall. By this arrangement the notches are engaged upon the cross shaft 33 when the trailer is resting upon the prop, and the rollers are engaged upon the lower wall of the guideways when the prop is supported by the brackets. The anti-friction rollers greatly reduce the thrust required in elevating the prop and facilitate the lowering of the prop by gravity.

Referring to Figure 4, in which the prop is illustrated in its retracted position, it will be noted that the prop assembly is approximately in the same angular position with respect to the brackets as shown in Figure 3. The retracting movement occurs when the actuating pin 44 is moved rearwardly by engagement with the lower fifth wheel of the tractor. The rearward movement of the push rod is transmitted to the links 37 which, in turn, thrust the prop assembly rearwardly. The prop, which at this time is free of the ground, is forced to follow the inclined brackets, thus moving the entire prop angularly and upwardly to the upward limits of the brackets.

Figure 9:
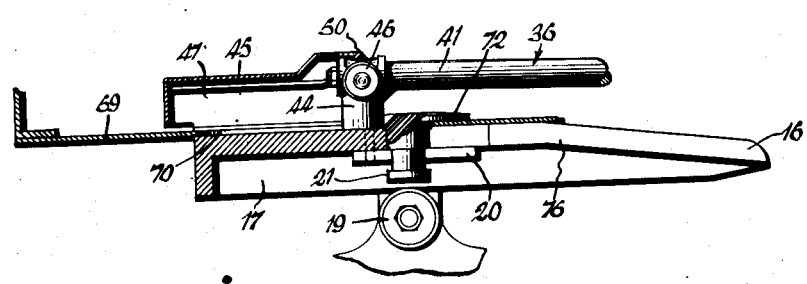
Figure 9 is a sectional view similar to Figure 8 showing the lower fifth wheel in coupled position with the prop push rod in completely retracted position.

When the trailer is lifted, the cross rod 33 of the prop drops from engagement with the notch 51 upon which it has been supported, and as previously stated, the prop is then supported by contact of the rollers 33 with the lower web 52 of the bracket 35. After the prop has been fully retracted, it is locked in this position by the engagement of the lower end of the actuating pin 44 with the upper surface of the lower fifth wheel as shown in Figure 9 of the drawings.

The prop retracting mechanism is provided with a device which unfailingly lowers the prop upon uncoupling the trailer from the tractor. This mechanism is operated by means of a pair of triggers 53, 53 at the forward end of the fifth wheel of the trailer. The triggers are pinned to a cross shaft 54 which is journalled in a pair of brackets 55, secured to the end cross member 56 of the trailer frame. Movement of the triggers is transmitted to one end of an operating link 57 which extends rearwardly and is in operating connection with a yoke 58. The yoke 58 straddles the push rod 41 and is disposed in the path of movement of a collar 59, secured on the push rod 41.

When the trailer is in coupled position, as shown in Figure 4, the collar 59 is in contact with the swinging end of the yoke 58. Upon uncoupling the tractor from the trailer, the lower fifth wheel of the trailer contacts the triggers 53, 53 which project through openings in the fifth wheel of the trailer. Upward movement of the triggers swings the yoke 58 forwardly against the collar 59 to initiate movement of the push rod 41 and thus impart movement to the prop causing the prop to drop by gravity into a position to support the trailer. The purpose of this mechanism is to insure movement of the prop in the event that the prop is, for some reason, unable to free itself and drop of its own weight. Such difficulties may occur due to the presence of ice, accumulations of dust or rusting of the parts, especially in the supporting brackets and rollers of the prop.

Described in detail, the yoke 58 is mounted upon a shaft 60 which is journalled in a pair of brackets 61, secured to a cross member 12 of the trailer frame. The actuating link 57 is secured to this cross shaft by means of an arm 63. The arm 63 is non-rotatably secured to the cross shaft 60 and is pivotally connected, as at 64, to a bifurcated clevis member 65, adjustably secured on the link or rod 57. The forward end of the rod 57 is operatively connected to the triggers 53 by means of an arm 66 which is integral with one of the triggers and pivoted to a clevis member in the same manner as the rear end of the link 57. The link 57 further includes a tension spring 67, one end of which is secured to the link 57 by means of a pin 68 and the opposite end of which is secured to a cross member 12 of the trailer frame. The spring 67 serves to retain the actuating mechanism in the position shown in Figure 3, so that the triggers 53 normally are withdrawn above the surface of the upper fifth wheel prior to coupling the tractor to the trailer.

The upper fifth wheel of the trailer comprises a flat metal plate 69, which is secured to the underside of the trailer frame. The central portion of the fifth wheel is slotted as at 70 to permit the longitudinal motion of the actuating pin 44. The fifth wheel is further provided with the clearance openings 71 for the triggers 53 which extend from the upper surface of the fifth wheel and project beyond the plane of the contacting or lower surface of the fifth wheel.

The king pin 21 of the trailer includes a flange 72 which is disposed against the upper surface of the fifth wheel and secured by means of rivets 73. The slide bracket 45 of the prop actuating pin is mounted on the fifth wheel and extends over the slot 72 through which the actuating pin extends. The plate making up the fifth wheel is properly reinforced and secured by longitudinal angle iron members 74.

*Description of operation*

The prop actuating pin 44 is disposed in alignment with the king pin of the upper fifth wheel. In coupling, the roller 15 at the forward end of the trailer engages the lower end of the angular skid 16 provided at the rear edge of the lower fifth wheel, and the wedging action of the inclined skid against the roller raises the forward end of the trailer and permits the lower fifth wheel to slide into place beneath the upper fifth wheel.

Figure 8:
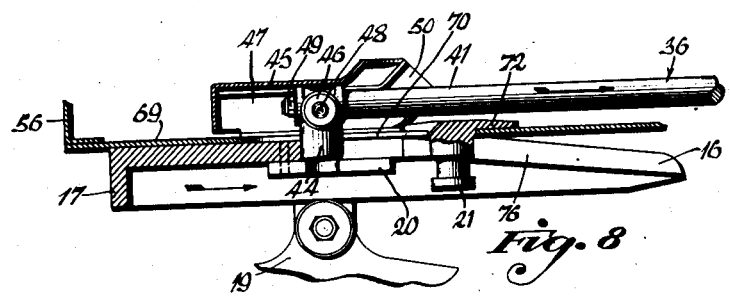
Figure 8 is a sectional view taken on line 8—8, Figure 7, illustrating the lower fifth wheel in contact with the prop retracting mechanism during coupling movement of the lower fifth wheel.

Since the actuating pin 44 projects below the plane of the upper fifth wheel, the pin is disposed in the throat 76 of the lower fifth wheel (as indicated on Figure 7), and is finally engaged against the end of the throat, as shown in Figure 8. Continued rearward movement of the fifth wheel translates the pin 44 and the actuating rod 41 rearwardly. The weight of the trailer is now resting upon the fifth wheel of the tractor and continued relative motion between the tractor and the trailer fifth wheel translates the rod 41 to its extreme rearward position, as shown in Figure 9. The rearward translation of the actuating rod is transmitted to the prop assembly by means of the pivoted links 37, causing the prop assembly to ride upwardly within the inclined brackets 32 and 35. Upon reaching the limit of its movement, the prop assembly is completely retracted, as shown in Figures 1 and 4. The supporting wheels of the prop at this time are raised clear of the roadway.

Referring again to Figure 9, illustrating the position of the actuating pin, it will be noted that the pin has been guided by means of the bracket 45 to its angularly retracted position. The pin 44 reaches this position at the time that the prop assembly is fully retracted. When the pin 44 clears the upper surface of the lower fifth wheel, the lower fifth wheel is free to move rearwardly into coupling relationship with the king pin 21. It will be evident from a study of the drawings that the prop is positively located in its retracted position by the engagement of the pin upon the upper surface of the lower fifth wheel. The inclined rearward portion 50 of the bracket 45 serves to prevent forward movement of the retracting rod since, in order to move in this direction, the actuating pin must move downwardly as guided by the inclined channel 50.

Since the lower fifth wheel is coupled in position with respect to the king pin of the upper fifth wheel, no movement of the push rod 36 is possible and the weight of the retracted prop is sustained by the contact of the actuating pin with the upper surface of the fifth wheel.

In the operation of uncoupling the tractor, the lower fifth wheel moves outward from beneath the forward end of the trailer, but lowering the prop is prevented until the edge of the throat 76 of the lower fifth wheel passes the edge of the actuating pin. At this time, the actuating pin will again move downwardly with respect to the upwardly inclined channel and the prop will be lowered as the uncoupling movement of the fifth wheel progresses.

Should any derangement of the prop mechanism prevent the prop mechanism from dropping simultaneously with the uncoupling movement of the tractor, actuation of the triggers 53 will serve to operate the yoke 58 to impart the initial starting movement to the push rod. After this initial movement, the dropping of the prop will continue by force of gravity so that the prop is fully extended prior to the time the tractor fifth wheel entirely uncouples from the trailer.

It will be apparent from the foregoing that the retracting and lowering of the prop is entirely automatic and that the prop will be unfailingly lowered prior to uncoupling, even though some derangement in the mechanism may occur.

The actuating pin 44 will not interfere in any way with the normal operation of the coupling members. The actuating pin functions as a supplemental guide pin and aids in guiding the members to coupling position. The actuating pin is approximately of the same size as the king pin, but does not depend sufficiently below the fifth wheel surface to interfere with the coupling jaws of the lower fifth wheel. The actuating pin, during the coupling movement of the fifth wheel, performs its function prior to the coupling of the king pin and, after performing its function, withdraws above the fifth wheel to an inoperative position so that the normal coupling operation of the regular king pin may take place. Thus, there is no interference with the usual operation of the coupling mechanisms and the mechanism of the present invention can cooperate without any special arrangement of tractor.

The arrangement of parts permits a very rugged design since the king pin and the actuating pin are entirely independent of each other and no special configuration of the king pin is necessary to accommodate the structure and function of the actuating pin.

Having described my invention, I claim:

1. In a tractor-trailer combination, a semitrailer including a chassis having wheels at its rear end and a retractable prop at its forward end, a tractor having a fifth wheel on its rear end, including a throat and coupling jaws at the inner end of the throat, said chassis of the trailer including a fifth wheel at its forward end having a stationary king pin adapted for engagement by said coupling jaws, and prop actuating means, including a member projecting below the surface of the chassis fifth wheel, and a guide slidably mounting said member in the chassis for shifting said member rearwardly by engagement with the tractor firth wheel and movable upwardly prior to coupling of the jaws and king pin.

2. In a semitrailer including a chassis having wheels at its rear end and a prop slidably mounted at its forward end in inclined guides; a fifth wheel at the forward end of the chassis including a stationary king pin, a prop actuating element connected to the prop adapted to be actuated by contact with the fifth wheel of a tractor, and a guide supporting said element and arranged for guiding the element in prop raising movement and moving the element clear of the tractor fifth wheel when the coupling has been completed.

3. In a tractor-trailer combination, a semitrailer including a chassis having wheels at its rear end and a retractable prop at its forward end, a tractor having a fifth wheel on its rear end including a throat and coupling jaws at the inner end of the throat, said chassis of the trailer including a fifth wheel at its forward end and a stationary king pin adapted for engagement by said coupling jaws, a prop actuating rod having a member projecting below the surface of the chassis fifth wheel, and a guideway for said push rod having an upturned portion at its rear end, said push rod shiftable rearwardly by engagement with the end of the throat of the tractor fifth wheel and movable upwardly in the guideway just prior to coupling of the jaws and king pin.

4. In a semitrailer including a chassis having wheels at its rear end and a prop slidably mounted at its forward end in inclined guides of the chassis; a fifth wheel at the forward end of the chassis including a stationary king pin, a prop actuating element depending below the surface of the fifth wheel and adapted to be actuated by contact with the fifth wheel of a tractor, a guide supporting said element and including an upturned portion toward its rear end adapted to elevate the element above the plane of the under surface of the trailer fifth wheel when the coupling is completed, a push rod connecting said element to the prop, and a tripping device for starting lowering movement of the prop, said tripping device including a finger engaged by the fifth wheel of the tractor connected to a finger engaging the push rod, whereby, as the tractor moves away from the semitrailer, an initial impetus is given to the prop actuating mechanism for causing the prop to drop into position by virtue of its own weight.

5. In a semitrailer, a frame, a prop supported for raising movement at the forward end of the frame, wheels supporting the rear end of the frame, a fifth wheel at the extreme forward end of the frame, including a stationary king pin, a horizontal guideway on the frame, and a member disposed in said guideway for movement therein and connected to the prop for raising the prop, said member adapted to be engaged by means on the truck as the truck is engaged under the fifth wheel of the semitrailer.

6. In a semitrailer including a chassis having wheels at its rear end and a prop slidably mounted at its forward end in inclined guides; a fifth wheel at the forward end of the chassis including a king pin, a prop actuating element connected to the prop adapted to be actuated by contact with the fifth wheel of a tractor, a guide supporting said element and arranged for guiding the element in prop raising movement and moving the element clear of the tractor fifth wheel for permitting completion of the coupling, and a tripping device for causing initial lowering movement of the prop, said tripping device, including means engaged by the fifth wheel of the tractor connected means, engaging the push rod.

7. In a semitrailer including a chassis having wheels at its rear end and a prop at its forward end adapted to be raised when the forward end of the semitrailer is supported on a tractor; a king pin depending below the extreme forward end of the chassis, a prop actuating pin depending beneath the chassis in longitudinal alignment with the king pin and connected to the prop, said prop actuating pin adapted to be actuated for raising the prop by engagement with the fifth wheel of the tractor as the tractor is backed under the forward end of the semitrailer, and means actuated by the tractor for causing, without fail, the lowering of the prop when the tractor is moved away from the trailer.

8. In a semitrailer, a frame, a prop supported for elevation at the forward end of the frame, wheels supporting the rear end of the frame, a fifth wheel at the extreme forward end of the frame including a stationary king pin, and a slidable prop actuating member connected to the prop, including a depending element projecting below the surface of the fifth wheel and in front of the king pin.

9. In a semitrailer including a chassis having wheels at its rear end and a prop at its forward end adapted to be raised when the forward end of the semitrailer is supported on a tractor; a king pin depending below the extreme forward end of the chassis, a prop actuating pin depending beneath the chassis in alignment with the king pin and connected to the prop, said prop actuating pin slidable mounted and adapted to be moved rearwardly for raising the prop by engagement with the throat of the slotted fifth wheel of a tractor, as the tractor is backed under the forward end of the semitrailer.

10. In a tractor-trailer combination having coupling means at the forward end of said trailer and cooperating coupling means on said tractor, a prop movable on said trailer; means for automatically raising and lowering said prop respectively upon coupling and uncoupling of said tractor comprising, a translatable rod for said prop, said rod extended from the prop to the coupling means of said trailer, means on said rod for elevating the prop upon translation of said rod, a shiftable actuating pin for said rod, a guideway for said pin, said pin secured at the forward end of the rod and projecting from said trailer coupling means, whereby upon coupling of said tractor, said shiftable pin is engaged by said tractor coupling means and shifted rearwardly in said guideway to elevate said prop.

11. In a tractor-trailer combination having a fifth wheel and a king pin at the forward end of said trailer, a fifth wheel and coupling means on said tractor, a prop on said trailer; means for automatically raising and lowering said prop upon coupling and uncoupling of said tractor comprising, a translatable actuating rod for said prop, said rod extended from the prop to the fifth wheel of said trailer, means on said rod for elevating the prop upon translation of said rod, a shiftable actuating pin for said rod, said pin secured at the forward end of the rod and projecting from said trailer fifth wheel forwardly of said king pin and in alignment therewith, means for retracting said pin upon rearward shifting thereof, whereby, upon coupling of said tractor, said shiftable pin is engaged by said tractor fifth wheel and shifted rearwardly to elevate said prop and retracts at the limit of rearward movement to clear the tractor fifth wheel and permit the same to couple to the trailer king pin.

12. In a tractor-trailer combination, said tractor having supporting and coupling means for the trailer, said trailer having cooperating supporting means and a king pin adapted to be engaged by said tractor coupling means, a prop for said trailer, a slidable prop actuating pin, said pin disposed on said trailer supporting means, a mounting element for said pin, said mounting element permitting horizontal translation of said pin relative to said king pin, means on said mounting element for retracting said pin vertically at the rearward limit of horizontal motion, connecting means between said pin and said prop, mounting elements for said prop to elevate the same upon rearward actuation thereof, whereby said prop is elevated by the relative lineal motion between the trailer and tractor fifth wheels prior to coupling, and said actuating pin is retracted vertically to permit coupling of the tractor to the king pin at the limit of the prop elevating motion and to hold the pin at rearward position with the prop raised.

13. In a tractor-trailer combination having a fifth wheel and a king pin at the forward end of the trailer, a fifth wheel and coupling means on said tractor, a prop on said trailer; means for automatically raising and lowering said prop comprising, an actuating pin, a connecting rod between said actuating pin and said prop, a mounting device for said prop, a mounting element for slidably sustaining said pin and arranged, whereby, upon coupling of the tractor to the trailer, said actuating pin is translated horizontally relative to said king pin and retracted vertically above the plane of said king pin, thereby permitting said tractor fifth wheel to slide beneath said actuating pin to lock the prop in retracted position.

14. In a semitrailer having a fifth wheel and coupling means at the forward end thereof engageable with the cooperating means of a tractor; a prop, means for raising said prop, and a device for initiating lowering of said prop upon uncoupling of the tractor comprising, a downwardly projected finger at the forward end of the trailer actuated by the tractor, and means in connection with said finger adapted to impart a movement to said prop in the direction of lowering, upon uncoupling of said tractor and trailer combination.

15. In a semitrailer, coupling means including a king pin at the forward end of the trailer, said means engageable with the coupling devices on a tractor, said devices adapted to support the trailer in draft connection with said tractor, a prop on said trailer, a horizontally slidable pin, connecting means between said pin and said prop actuable for raising and lowering said prop, a mounting bracket for said pin, said bracket having horizontal guideways and said pin having guide elements engaged in said guideways, said mounting bracket including an upwardly inclined guideway extension, said extension adapted to retract the pin at the rearward limit of travel of said pin, whereby, upon coupling of the tractor, said actuating pin moves in a horizontal plane to element said prop and, at the end of rearward travel, is retracted upwardly to clear said tractor coupling device and permit the same to engage with said king pin.

16. In a semitrailer having coupling means and a fifth wheel at the forward end adapted to cooperate with the coupling means and a fifth wheel of a tractor, said trailer having an automatic prop and means for raising the prop on coupling of the tractor; a device for initiating lowering of said prop comprising, a trigger projecting from said trailer fifth wheel, a yoke, said yoke operatively connected with said trigger and said yoke in operative connection with said prop, whereby said trigger is adapted to be contacted by the tractor fifth wheel upon uncoupling to impart a movement to said prop to initiate the lowering of the prop.

17. In a semitrailer, coupling means at the forward end of the semitrailer adapted to cooperate with the coupling means of a tractor, an automatic prop, and means for actuating the prop upon uncoupling of the tractor to lower the prop, comprising, a plurality of prop actuating fingers, said fingers disposed on said trailer coupling means, connecting means between said fingers and said prop, said fingers adapted to be actuated upon relative lineal motion between the trailer fifth wheel and the tractor fifth wheel in uncoupling, and thereby imparting movement to said prop to initiate the lowering of the same.

18. In a tractor-trailer combination which includes a tractor having a tractor fifth wheel including a coupling means, a wheeled semitrailer having a trailer fifth wheel including a king pin for engagement with the coupling means of said tractor fifth wheel, and a retractible prop for supporting one end of the semitrailer; a prop actuating mechanism connected to the prop including a member extending below the trailer fifth wheel shiftable rearwardly by the tractor fifth wheel to cause raising of said prop, and a horizontal guideway for guiding said member in lineal, rearward movement.

19. In a tractor-trailer combination which includes a tractor having a tractor fifth wheel including coupling means, a wheeled semitrailer having a trailer fifth wheel including a king pin for engagement with the coupling means of the tractor fifth wheel and including a retractable prop; a guide on the semitrailer, and a guided member in the guide projecting below the trailer fifth wheel ahead of the king pin and shiftable rearwardly by the tractor fifth wheel to retract the prop and elevated by the guide to permit king pin engagement with the tractor coupling means.

20. A tractor trailer combination which includes a tractor having a tractor fifth wheel including a throat and coupling means in the throat, a wheeled semitrailer having a trailer fifth wheel, and a king pin for engagement with the coupling means of the tractor fifth wheel, said semitrailer including a retractable prop for supporting one end thereof; means attached to said prop and depending below the trailer fifth wheel ahead of the trailer king pin, said means shiftable rearwardly by engagement with the tractor fifth wheel throat for retraction of the prop, and means to elevate said first-named means to permit king pin engagement with the tractor coupling means.

21. A separable tractor-trailer combination including a tractor having a throated trailer fifth wheel including coupling means, a wheeled semitrailer having a trailer fifth wheel and including a king pin for engagement with the coupling means of the tractor fifth wheel, said semitrailer including a retractable prop for supporting one end thereof; a guide on the semitrailer, and a push rod engaged in said guide and having a depending front end and having its rear end attached to the prop, said depending front end guided below the trailer fifth wheel ahead of the king pin and shiftable rearwardly by the tractor fifth wheel throat and raised by the guide to permit coupling.

22. In a wheeled semitrailer, a trailer fifth wheel including a stationary king pin, a retractable prop for supporting one end of the semitrailer, a prop actuating element connected to the prop adapted to be moved by contact with the throat of a tractor fifth wheel, and a way guiding said element for prop-raising movement and constructed and arranged for raising said element to allow the king pin to enter the throat of the tractor fifth wheel fully.

23. A semitrailer retractable prop mechanism comprising, an inclined guideway, a prop movable in said guideway, and a mechanism for operating said prop including a guided push rod having a depending front end and coupled to said prop, and a guide for the front end of said push rod arranged for elevating the push rod and retracting the prop and adapted for holding the push rod in locked position.

24. A retractable prop mechanism comprising, a prop, a push rod coupled to the prop having a depending forward end, and a guideway for the forward end of the rod for guiding the push rod in horizontal movements for raising and lowering the prop and arranged for causing raising movement of the forward end of the push rod.

25. In a semitrailer having a fifth wheel and coupling means disposed at the forward end thereof, said fifth wheel and coupling means engageable with the cooperating means of a tractor;

a retractable prop for supporting the forward end of the semitrailer, a tripping device on said semitrailer, and means for raising said prop, said raising means actuated by contact with the cooperating means of a tractor, said tripping device connected to said prop independently of said raising means and effective when disengaged by the cooperating means of the tractor for initiating the lowering movement of the prop.

26. In a tractor-trailer combination, a tractor, a wheeled semitrailer including a retractable prop for supporting the coupling end thereof; means on said semitrailer for raising and lowering said prop, said tractor and trailer including cooperating fifth wheel elements, a tripping device on said semitrailer supplemental to said prop actuating means for starting lowering movement of said prop, said tripping device actuated by the fifth wheel element of the tractor as the combination is separated.

JAMES J. BLACK.